(12) United States Patent
Pribytkov

(10) Patent No.: US 6,561,698 B1
(45) Date of Patent: May 13, 2003

(54) DESIGN OF ROLLING BEARINGS

(76) Inventor: Lev Sergeevish Pribytkov, 355 Thomas Blv. 3F, Orange, NJ (US) 07050

( * ) Notice: Subject to any disclaimer, the term of this patent is extended or adjusted under 35 U.S.C. 154(b) by 0 days.

(21) Appl. No.: 09/568,797

(22) Filed: Sep. 6, 2000

Related U.S. Application Data

(63) Continuation-in-part of application No. 08/534,745, filed on Sep. 27, 1995, now abandoned, which is a continuation-in-part of application No. 08/002,974, filed on Jan. 11, 1993, now abandoned.

(51) Int. Cl.[7] ............................................. F16C 33/58
(52) U.S. Cl. ....................... 384/513; 384/516; 384/569
(58) Field of Search .................................. 384/445, 450, 384/456, 460, 510, 513–516, 535, 564, 624, 627, 454, 548, 567, 604, 614

(56) References Cited

U.S. PATENT DOCUMENTS

| | | | | |
|---|---|---|---|---|
| 1,149,542 A | * | 8/1915 | Risley | 384/552 |
| 1,178,526 A | * | 4/1916 | Laycock | |
| 3,128,134 A | * | 4/1964 | Dorl | 384/454 |
| 3,667,822 A | * | 6/1972 | Armstorng | 384/565 |
| 3,829,183 A | * | 8/1974 | Hingley | 384/565 |
| 5,071,265 A | * | 12/1991 | Bowen et al. | 384/494 |

* cited by examiner

Primary Examiner—Thomas R. Hannon

(57) ABSTRACT

An improved rolling bearing. The improved rolling bearing utilizes a novel design in the construction and location of the raceways or rings in which the rolling elements are secured. This novel design provides for reducing of slide of the parts rolling element within rings, reducing blow loads and so noise, shock absorption, increasing endurance, durability and dependability rolling bearings.

11 Claims, 4 Drawing Sheets

FIG. 2b. Prior Art.
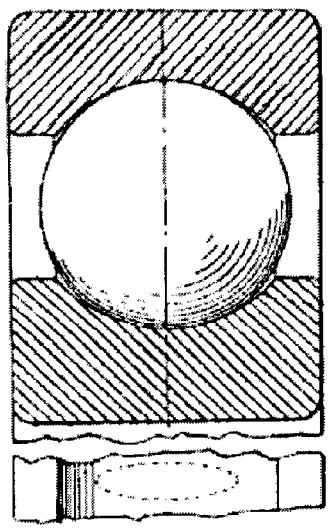
FIG. 2c. Prior Art.
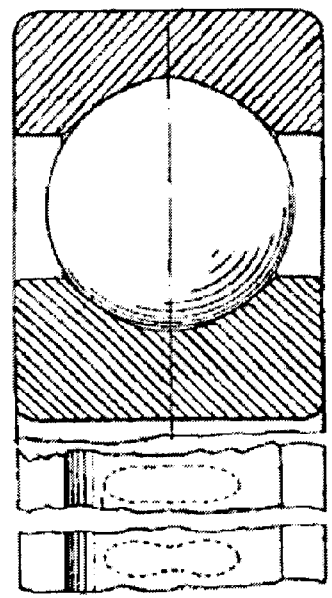
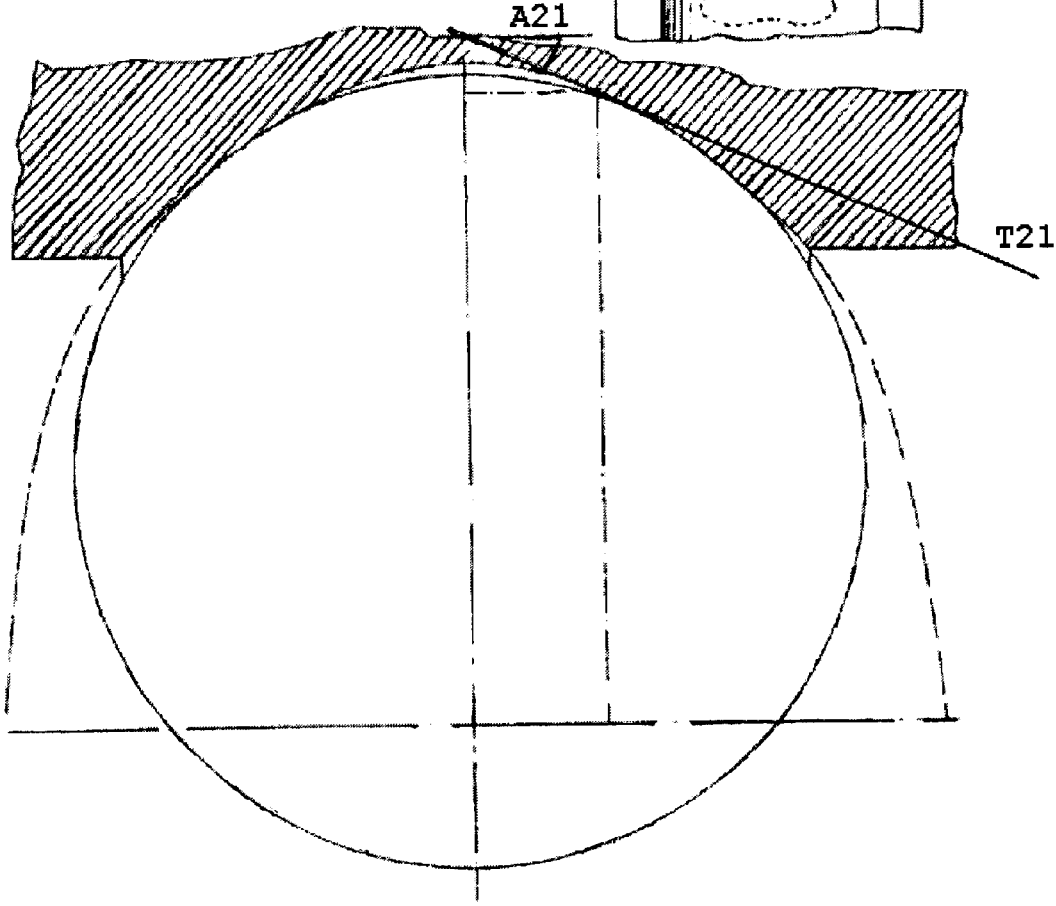
FIG. 2a. Prior Art.

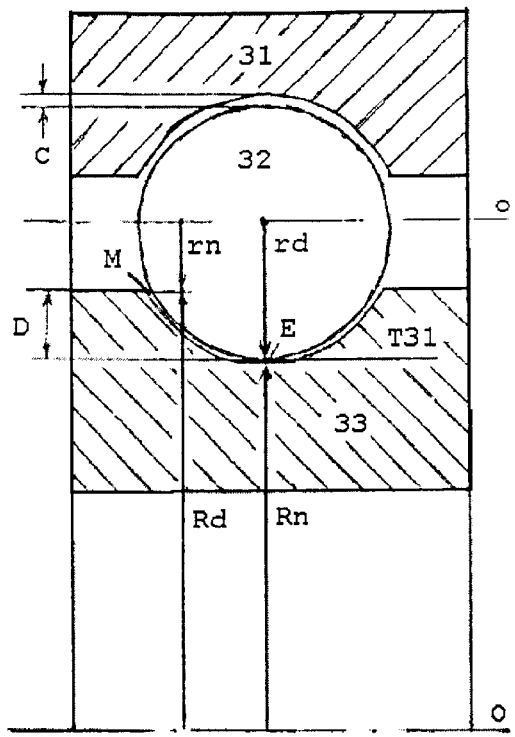
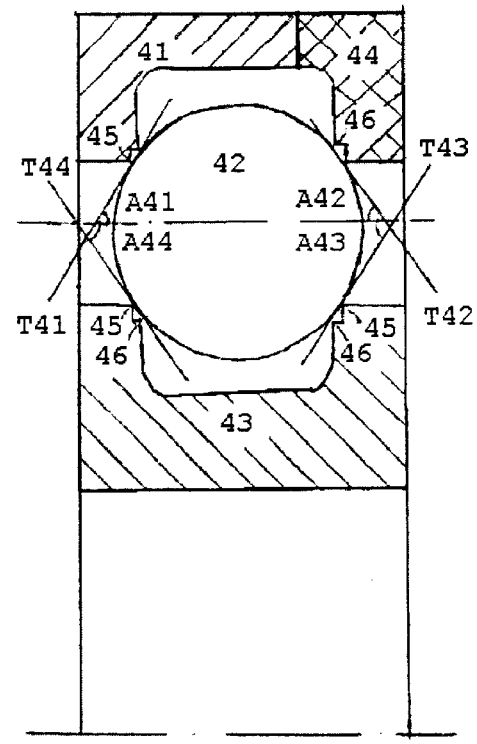
FIG. 3. Prior Art.　　　　　　FIG. 4.
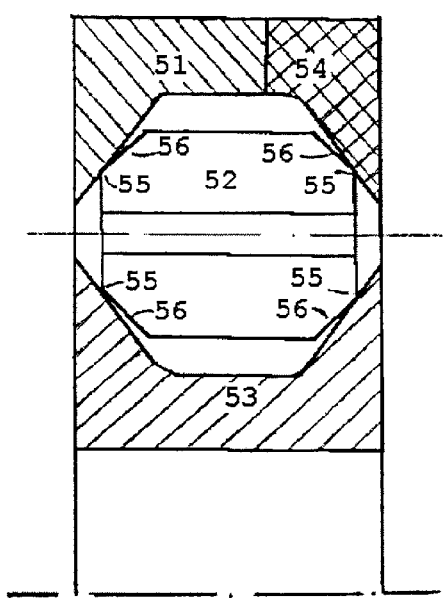
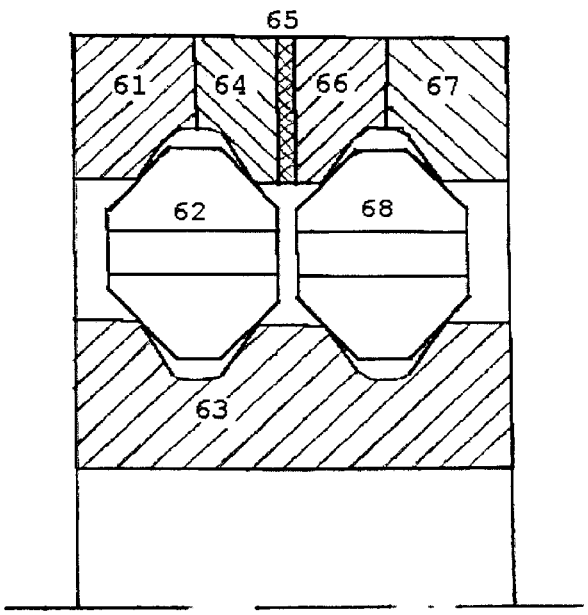
FIG. 5.　　　　　　　　　　FIG. 6.

DESIGN OF ROLLING BEARINGS

This is a CIP of Ser. No. 08/534,745 filed Sep. 27, 1995, now abandoned, which is a CIP of Ser. No. 08/002,974 filed Jan. 11, 1993, now abandoned.

BACKGROUND OF THE INVENTION

1. Field of Invention

This invention relates to bearings, and refers to ball-bearings, roller-bearings, and the like.

The invention is intended to improve design of bearing rings and rolling elements, and particularly, of bearing rings which provide for additional loading areas on rolling elements under overloads, reduced slide of rolling elements within the rings, reduced blow loads and so noise, shock absorption, increased heat transfer and endurance.

2. Discussion of the Prior Art

The basic design of the modern ball bearing can be attributed to Robert Hooke in 1685. Since that time, thousands of engineers and scientists have endeavored to improve the design of these rolling bearings in order to achieve a longer useful life for the rolling bearings. However, after three centuries of effort, few manufacturers are able to design ball bearings, which can achieve a predictable useful life of some percents of the theoretical service time of a ball bearing.

Standard rolling bearings, including ball and roller bearings, are generally used to support a given load while simultaneously permitting rotation and/or translatory motion of a shaft or sliding element. The forces acting between the ball or roller and the races of rings which hold the rolling elements in place develop small areas of contact, commonly referred to as loading contact points, where the rolling element comes into contact with the races. As a consequence, even though the loading may be light to moderate, the stresses induced on the surfaces of the rolling elements and races are usually large. Depending upon how well the ball or roller bearings accept the applied and induced loads determine the particular rolling element's endurance.

A problem related to the loading area problem discussed above is the sliding. For example, when the loading is high, the rolling motion of the ball is replaced by sliding of the rolling element, which leads to various problems. One problem caused by this sliding motion in the reduced efficiency of the bearing assembly. Bearing assemblies are designed in a manner, which utilizes the rolling action of the balls or rollers to permit minimal friction and constrained motion of a first body relative to a second body. If the rolling element slides as opposed to roll, the purpose of the bearing assembly is defeated due to the increased friction. A second and related problem, which is caused by the sliding motion of the rolling elements, is the reduction in the useful life of the rolling elements and the races. The increased friction causes wear on the surfaces of each of these elements thereby reducing the over-all life of the bearing assembly.

The modern manufacturing of ball and roller bearings and their associated races is a highly sophisticated process in which extremely high quality bearing assemblies are produced for a virtually unlimited variety of uses. These modern manufacturing techniques result in increased accuracy of bearing geometry, smoother rolling element surfaces in the races, high quality steel rolling elements, all of which when combined result in minimization of the incidence of rolling elements surface fatigue failure.

Modern manufacturing techniques and advances in material science have led to high quality bearing assemblies; however, modern bearing assembly design fails to utilize a design in which the rolling element is subjected to additional loading or contact points, to reduce shock stresses on the rolling element, and to reduce the sliding. Accordingly, bearing manufacturers have been unable to manufacture rolling bearings, which have a useful life approaching the theoretical limit attributed to rolling bearings.

SUMMARY OF THE INVENTION

The present invention is directed to an improved bearing assembly for

1) Reduction and even, practically, expulsion slide rolling elements within rings;
2) Reduction and stabilization moments start and rotation;
3) Distribution loads and overloads over increased areas of contact with reduced sliding;
4) Reduction of friction for radial and axial loads;
5) Increased durability, dependability, and predictability;
6) Increased endurance as to axial and radial loads;
7) Improved heat transfer from areas of slide;
8) Reduction of axial and radial shock loads;
9) Shock absorption of axial and radial loads.

The improved bearing assembly comprises rolling elements secured between outer and inner rings and a separator.

The rings can be designed in a manner to provide additional points or lines of contact for momentary overloads, for example, by designing the inner and/or outer raceways with additional ledges. The rolling elements can be with axial aperture and ledges or grooves for points or lines of contact with races. Points or lines of contact between rolling elements and races must have minimal difference distances from the axis of rotation of the rolling element especially for ordinary load, and minimal angle average tangent above 60°.

The present invention provides for bearing assemblies having increased efficiency and durability. The improved rolling bearing utilizes a novel design in the construction of the race rings in which the rolling elements are secured. This design provides for the reduction of coefficient of friction assembly by: reducing slide of the rolling elements within the races rings; reducing specific loads under overload in point or line contact of rolling elements with races. The design also reduces the effect of radial and axial blow loads by substantially eliminating the clearance between the rolling element and races, improves heat transfer from areas of slide by division points or lines contact rolling elements with rings; shock absorbs axial and radial overloads thanks to an axial aperture in the rolling element and increased height walls of gutters for races on rings; creates ability to carry essential both axial loads for roller bearing. The improved rolling bearings of the present invention are particularly useful in such diverse applications as navigation devices, including gyroscopes, turbines, and even can be utilized in Diesel and gas engines for automobiles. The improved bearing assemblies are simple and inexpensive to manufacture.

For greater clarity and to aid in understanding the invention ten drawings are attached in which are illustrated examples of how the object claimed may be made in practice, and which it cited and shown simply as an example and thus without any limitation implied. The said drawings show different examples of how invention is made, according to the different technical characteristics.

BRIEF DESCRIPTION OF THE DRAWINGS

FIGS. 2a–2c, illustrates a single section of a prior art patent U.S. Pat. No. 2,142,477 radial ball bearing with drawn tangent and its angle to a line parallel of axis rotation of a ball.

FIG. 3, illustrates a single section of the most widespread prior art design of radial ball bearing with drawn tangent line.

FIG. 4, illustrates a single section of the improved design of ball bearing with drawn tangents and their angles to an axis rotation rolling element with eliminated sliding for radial and axial loads, and additional points contacts for overloads.

FIG. 5, illustrates a single section of the improved design of rolling bearing with reduced sliding for axial and radial loads, and increased overload capacity.

FIG. 6, illustrates a single section of the improved design of rolling bearing with reduced sliding for axial and radial loads increased shock absorption axial and radial overloads and doubled capacity to carry axial loads.

DESCRIPTION OF THE PREFERRED EMBODIMENTS

The present invention is directed to improve rolling bearings. The improved rolling bearing utilizes a novel design in the construction and location of the races on rings in which the rolling elements are secured. This novel design provides for:

1) Reducing slide of rolling elements within inner and outer rings, blow loads, and noise, specific loads under overloads;
2) Increasing durability, heat transfer, way passing by rolling element under load, and predictability endurance life.
3) Creating possibility for shock absorption blow loads, carry essential both axial loads for roller bearings.

Figure 1:
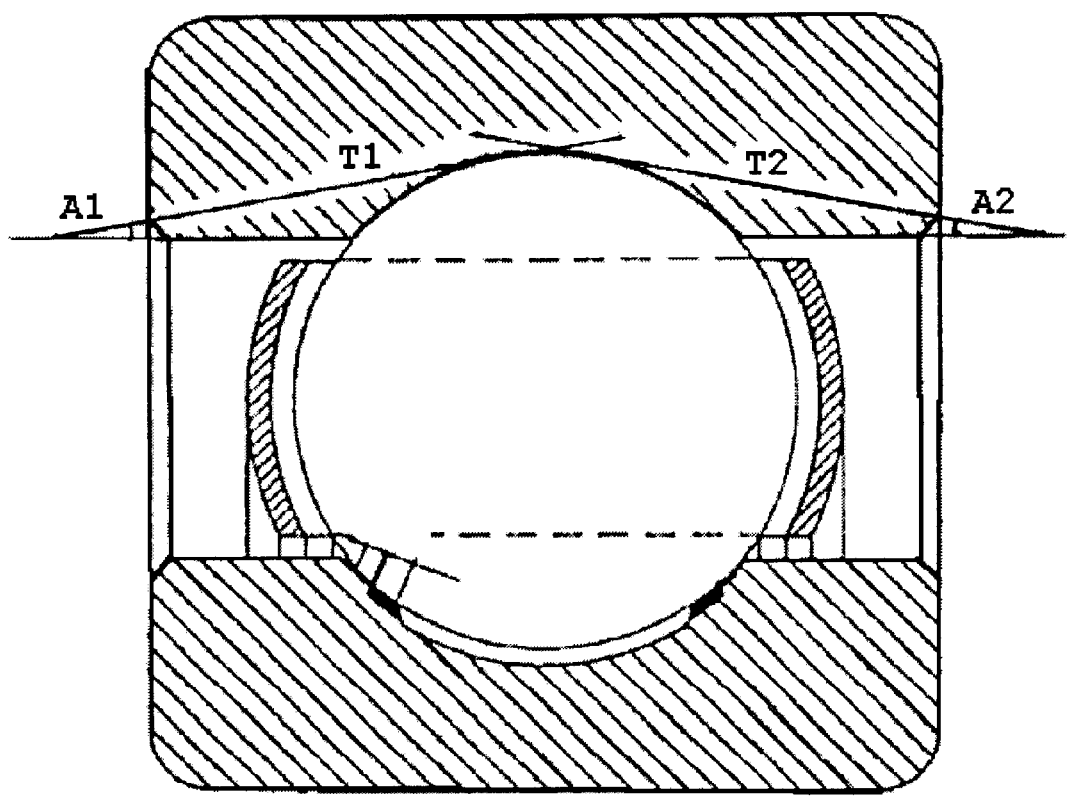
FIG. 1, illustrates a single section of a prior art patent # EP 517642A radial ball bearing having two shortened circle loading lines in outer ring with drawn tangents and their angle to a line parallel of axis rotation of a ball.

Referring to FIG. 1, there is shown a single section radial ball bearing, patented by Sanchez #EP 517642A with drawn T1 and T2 average tangents to shortened lines of contact of the ball with raceways, with their angles A1 and A2 obviously below 10° with respect to the line parallel to the axis rotation of the ball and the axis of rotation of the ball itself. The disadvantage of such low angle is development of wedging effect under practically any axial load with resulting essential increase in friction and therefore wear of the surfaces of the races and rolling elements.

Referring to FIG. 2, there is shown a single section radial ball bearing patented by Murden U.S. Pat. No. 2,142,477 with drawn T21 average tangent to a line of contact of the ball with the race, and its angle A21 obviously below 30° with respect to the line parallel to the axis rotation of the ball and the axis rotation of the ball itself. The disadvantage of such low angle is development of wedging effect under axial load with resulting essential increase in friction and therefore increase in the wear of surfaces of the races and the rolling elements.

Referring to FIG. 3, there is shown a single section of the most widespread radial ball bearing comprising a rolling element 32, outer 31 and inner 33 rings, and a separator(not shown). Its gutters are races. Under no load condition, in the upper part of the ordinary bearing there is a clearance C or gap between the rolling element and outer ring and an arc of contact between the ball and the inner ring. The gap causes noise and increased shock loads in case of vibration. However, in a load side, the clearance is eliminating and a second arc of contact exists between the ball and the outer ring. The load condition represents the normal operation mode of the lower part bearing. The lines of contact in section perpendicular to the movement of ordinary ball bearing are arcs or other fluently changing lines. The difference D between the nearest and the distant points of the line contact between the race with the ball and axis of rotation of ball causes different ways needed to pass by different parts of the same ball after performing one turnover by ball, and so requires the slide ones. The slide in its turn causes failure for fatigue of the surface contact between balls and races. $N_n=2 R_d/2 r_n=R_d/r_n =(R_n+D)/r_n=(R_n+D)/(r_d-D)$; $N_d=2R_n/2r_d=R_n/r_d$; But $N_n \ne N_d$ as $(R_n+D)/(r_d-D)$ cannot be equal $R_n/r_d$; Wherein $N_n$ is the number of revolutions to be performed by the part of the ball passing full circumference of the ring without slide in points M of contact with the race nearest to the axis of rotation of the ball.

$N_d$—is the number of revolutions to be performed by the part of ball passing full circumference of the ring without slide in points E of contact with the race distant to the axis of rotation of the ball;

$R_n$—is the distance between the axis of bearing and the nearest point of contact of the ball with race;

$R_d$—is the distance between the axis of bearing and the distant point of contact of the ball with race;

rn—is the distance between the axis of rotation of the ball and the nearest point of its contact with the race;

$r_d$—is the distance between the axis of rotation of the ball and the distant point of its contact with the race;

D—is the difference between the nearest and the distant point of contact of the ball with the race and axis of rotation of the ball.

If one examines the current design of the rolling bearing of FIG. 3 with sizes 1:1, we one will find the ball part at the point M requires the ball to perform 6 turns for passing full circumference inner ring without slide, but the same ball have to perform in points of contact E only 1.5 turns for passing by full circumference inner ring without slide. It means the ball is forced to slide 4.5 turns in the point E, M, or both. An average tangent T31 has a zero degree angle or parallel to the axis of rotation of the ball in this design of bearing.

Referring now to FIG. 4, there is shown a single section version of the improved rolling bearing. The improved rolling bearing comprises a ball –42–, an outer ring 41+44, and an inner 43 ring, and a separator(not shown). However, the design of the bearing rings 41+44 and 43 radically differentiate the improved ball bearing from that of the standard radial ball bearing of FIG. 3. It has eight races. Four points or lines contact 45 between ball and races are for radial and axial normal loads and four ones 46 are for overloads. There are shown T41, T42, T43, and T44 average tangents with their angles to the axis rotation of the ball A41, A42, A43, and A44 respectively above 50° for essential reduction of wedging effect under axial loads. Reduced difference between nearest and distant from ball's axis rotation points or curved lines contact 45 the ball with races provides reduced slide for line-like contacts and eliminates slide for point-like contacts for ordinary loads. Ledges 46 provide additional points or curved lines contact for axial and radial overloads due to the increased elasticity of the walls of the gutter allowing them to bend under overloads. Lack of clearance between the rolling element and races except as necessary for temperature compensation secures increased way passed by ball under load, essentially reduced blow loads and so noise.

Referring now to FIG. 5, there is shown a single section version of the improved rolling bearing containing a rolling element 52, outer 51+54 and inner 53 rings. This version illustrates bearing with four point-like contacts 55 with eliminated sliding for ordinary loads and four straight line contacts 56 angled more than 45° to the axis of rotation of a rolling element for essential reduction wedging under axial loads. Lines of contact 56 appear under axial or radial overloads as a result bending walls of gutters. A possible axial aperture in the rolling element provides increased amortization of shock loads.

Referring now to FIG. 6, there is shown a single section version of the improved rolling bearing containing rolling elements 62, and 68, outer 61, 64, 65, 66, 67, and inner 63 rings, and a separator(not shown). This version shows a way of reducing in half specific radial and axial loads without increasing sliding by keeping the same different distances from the axis rotation of the rolling element to its the nearest and distant points of contact with races. One outer 61–64 or 66–67 ring has to be movable in a mechanism, and the ring 65 possesses some elasticity for leveling axial load on outer rings.

Figure 7:
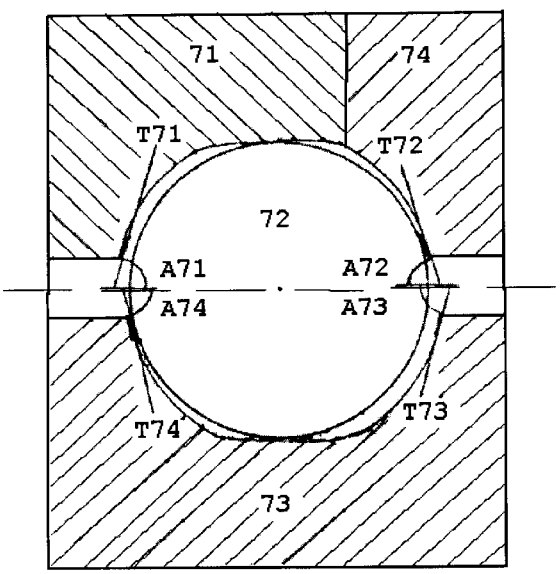
FIG. 7, illustrates a single section of the improved design of rolling bearing with reduced: sliding for axial loads, eliminated sliding for radial loads, reduced radial shock loads and so noise.

Referring now to FIG. 7, there is shown a single section rigid version of the improved design containing rolling element 72, outer ring 71+74 and inner 73 ring, and a separator(not shown). This drawing is intended to show principles of the novel design:

1. Separation points or lines of contact of the rolling element with the races intended to carry only axial loads placed on top of gutters and marked by tangents T71, T72, T73, T74, and intended to carry only radial loads placed on bottom of gutter of the rings;
2. Elimination of a gap between the rolling element and races, except as necessary for temperature compensation, for radial loads;
3. Provision of a gap between the rolling element and the races for axial loads a bit more than is necessary for temperature compensation;
4. Provision of points or lines of contact of the rolling element with the races with an average tangent angled (T71, T72, T73, and T74) to the axis of rotation of the rolling element above 50° for reducing wedging effect under axial load;
5. Possibility provision amortization: for radial load by implementing an axial aperture in the rolling element, and for axial load by increasing the height or reducing the width of the walls of gutters.

Figure 8:
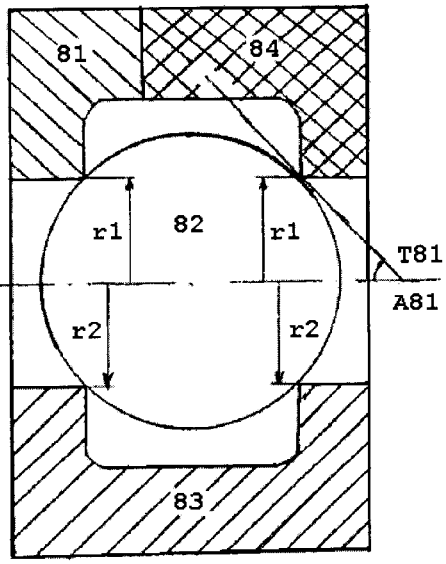
FIG. 8, illustrates a single section of the improved design of rolling bearing with practically eliminated sliding for axial and radial loads, and increased shock absorption.

Referring now to FIG. 8, there is shown a single section of the rigid version novel design bearing consisting a ball 82, outer ring 81+84 and inner ring 83, and a separator (not shown). This is the simplest modification having races with equal 45° angled average tangents and possessing equal load carry capacity for radial and axial loads. The modification with point-like contact of the rolling element with the races obtains an almost ideal design of the rolling bearing for instruments and gyroscopes possessing:

1) Very small and independent from point of departure moment of start;
2) Very small and stable without slide coefficient friction as for radial and so for axial loads;
3) Reduced axial and radial blow loads and so noise, due to an absence of clearance, except as required for temperature compensation, between balls and races;
4) Ability of shock absorption for radial and axial overloads due to increased elasticity of the walls of the gutters.

FIG. 8 illustrates also equidistant points of contact of the rolling element with the races from its axis of rotation. Arc-like contacts in this design allow increased axial and radial loads with some increasing coefficient of friction and dependence moment start from point of departure, but all its characteristics remain better than ordinary ball bearings due to: Increased heat transfer from areas slide by separating ones and involving more metallic mass in absorption and dispersion heat; Reduced clearance between balls and races; Elasticity of the walls of the gutters; reduced difference in distances between nearest and distant points of lines of contact of the balls with the races from the axis of rotation of the balls. In these versions of the novel design of the rolling bearings there is an amortization capacity, due to increased elasticity of the walls of the gutters, as they move apart under the influence of radial and axial overloads.

Figure 9:
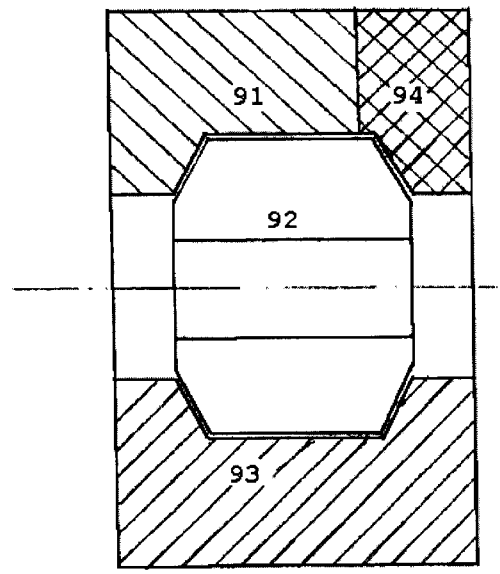
FIG. 9, illustrates a single section of the improved design of rolling bearing with eliminated sliding and essentially increased capacity for radial loads, and reduced sliding for axial loads.

Referring now to FIG. 9, there is shown a single section of the rigid version novel design bearing, comprising a rolling element 92, outer 91+94 and inner 93 rings, and a separator(not shown). This version is intended for unlimited radial load without slide with races on the bottom of the gutter. There is practically a lack of clearance between the races on the rings and the rolling element for radial loads, except necessary for temperature compensation, which reduces blow loads and so noise. The axial aperture is for shock absorbing overloads; the same distance between all points of contact of the rolling element with the rings and its axis of rotation eliminates slide for radial load. This design provides the possibility to carry axial load for the bearing with very good conditions for heat transfer from areas of slide by division lines of contact for axial loads and involving a big metallic mass and surface for absorption and dispersion of heat due to a bit more gap between the rolling element and the races for axial load than is necessary for temperature compensation. Such design of bearing guarantees for both axial loads small slide friction, due to small difference distances between the nearest and distant points on lines of contact of the rolling element with the raceways from its axis rotation. The greater 70° angle of contact line of the rolling element with ring to the axis of rotation practically eliminates wedging effect under axial load.

Utilization of cylindrical rolling elements allows mass production essentially reduce dispersion all characteristics rolling bearings, due to possibility of making it easier to manufacture ones with less deviation from required geometric form.

Figure 10:
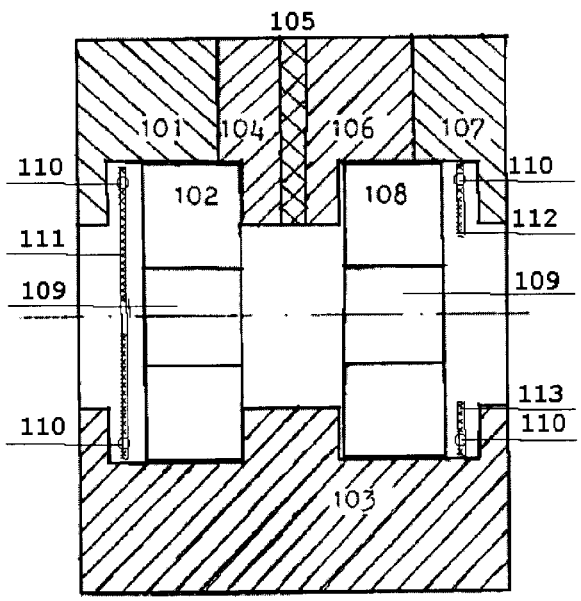
FIG. 10, illustrates a single section of the improved design of rolling bearing with eliminated sliding for radial and axial loads by balls embodied in separators between rolling elements and ring and doubled capacity for axial loads.

Referring now to FIG. 10, there is shown a single section of the rigid version novel design bearing consisting rolling elements 102 and 108 with opening 109, outer 101, 104, 105, 106, 107 and inner 103 rings, and a separator(not shown). One advantage this modification is a lack of wedging effect under axial load due to 90° angle between the line of contact of the rolling element with the races for axial load and its axis rotation. The other one is doubled capacity to carry axial load without increasing sliding due to keeping the same difference between the nearest and distant points of contact of the line of rolling element with the races to its axis rotation, backed up by elastic ring 105 for leveling specific loads.

It also shows balls 110, embodied in three versions of plain separators:

1. 111 for attachment to rolling elements;
2. 112 for attachment to outer rings;
3. 113 for attachment to inner ring.

In general, the described structures are subject to wide variation and modification without departing from the scope or intent of the invention, all of which variations and modifications are to be included within the scope of the present invention.

What is claimed is:

1. IMPROVED DESIGN OF ROLLING BEARING comprising:
    an inner race ring having radially directed wall sections;
    an outer race ring having radially directed wall sections, being radially spaced from said inner ring;
    rolling elements radially between said outer ring and the inner ring, said each rolling element having an axis of rotation;
    said rolling elements having predetermined shape lines of contact on said radially directed wall sections, between the rolling elements and the inner and outer race rings, said lines of contact including four points of contact for radial and axial normal loads and four additional points of contact for axial and radial overloads;
    said four lines of contact for radial and axial normal loads being defined by tangents having an average angle with respect to said rolling element axis of rotation greater than 50°;
    said race ring wall sections being elastically deflectable to permit said balls to contact said four additional contact points during overloads.

2. IMPROVED DESIGN OF ROLLING BEARINGS according to claim 1 characterized by the rolling elements having an axial through opening for alleviation overloads.

3. IMPROVED DESIGN OF ROLLING BEARINGS of claim 1 wherein said lines of contact for axial loads being defined by tangents having an angle with respect to said rolling element axis of rotation is 90°, in order to eliminate wedging effect.

4. IMPROVED DESIGN OF ROLLING BEARINGS of claim 1 and further comprising a separator located between a radial side wall of each of the rolling elements and the radially directed side walls of the inner and outer race rings, said separators including a number of balls to substantially eliminate the sliding friction between the rolling elements and races for axial loads.

5. IMPROVED DESIGN OF ROLLING BEARINGS of claim 4 further comprising the separators with balls attached to the outer and inner rings, said separators with balls attached to the outer and inner rings further securing endurance of the rolling bearings.

6. IMPROVED DESIGN OF ROLLING BEARINGS of claim 4 further comprising the separators with balls attached to the rolling elements, said separators with balls attached to the rolling elements further securing endurance of the rolling bearings.

7. IMPROVED DESIGN OF ROLLING BEARINGS of claim 1 further including an additional set of predetermined lines of contact, said additional set of predetermined lines of contact include additional four or more points of contact for radial and axial normal loads and additional four or more points of contact for axial and radial overloads.

8. IMPROVED DESIGN OF ROLLING BEARINGS of claim 7 further including an elastic ring between components, said elastic rings are leveling loads in the contact areas, thereby further securing endurance rolling bearings.

9. IMPROVED DESIGN OF ROLLING BEARING comprising:
    an inner race ring having radially directed wall sections;
    an outer race ring having radially directed wall sections, being radially spaced from said inner ring;
    balls radially between said outer ring and the inner ring, said each ball having an axis of rotation;
    said balls having predetermined shape lines of contact on said radially directed wall sections, between the balls and the inner and outer race rings,
    said lines of contact including four points of contact for radial and axial normal loads and four additional points of contact for axial and radial overloads;
    said four lines of contact for radial and axial normal loads being defined by tangents having an average angle with respect to said rolling element axis of rotation greater than 50°;
    said race ring wall sections being elastically deflectable to permit said balls to contact said four additional contact points during overloads.

10. THE IMPROVED DESIGN OF ROLLING BEARINGS of claim 9 wherein contact points between the balls that arise between their races are predetermined, said predetermined contact points with said races situated inside their ring equidistant from the axis of rotation of the balls thereby eliminating sliding and secure predictability and endurance rolling bearings.

11. THE IMPROVED DESIGN OF ROLLING BEARING comprising:
    an inner race ring having radially directed wall sections;
    an outer race ring having radially directed wall sections, being radially spaced from said inner ring;
    balls radially between said outer ring and the inner ring, said each ball having an axis of rotation;
    said rolling bearing having predetermined points of contact on said radially directed wall sections, between the balls and the inner and outer race rings;
    said points of contact being defined by tangents having an angle with respect to said rolling element axis of rotation equal to 45°;
    said race ring wall sections being elastically deflectable wherein providing rolling bearing the most suitable for all types of gyroscopes.

* * * * *